United States Patent [19]

Levine

[11] Patent Number: 4,716,470

[45] Date of Patent: Dec. 29, 1987

[54] METHOD FOR PREVIEWING UNDEVELOPED FILM

[76] Inventor: Alfred B. Levine, 2924 Terrece Dr., Chevy Chase, Md. 20815

[21] Appl. No.: 18,577

[22] Filed: Feb. 25, 1987

Related U.S. Application Data

[60] Division of Ser. No. 834,923, Feb. 28, 1986, which is a continuation-in-part of Ser. No. 617,344, Jun. 4, 1984, Pat. No. 4,588,282.

[51] Int. Cl.$^4$ ............................................. H04M 1/00
[52] U.S. Cl. .................................... 358/256; 358/909;
    358/76; 358/293; 358/294; 358/229; 354/432;
    354/476
[58] Field of Search ............... 358/256, 909, 293, 294,
    358/76, 296, 102, 229; 354/432, 431, 476

[56] References Cited

U.S. PATENT DOCUMENTS 4,303,322  12/1981  Someya ................................ 354/432
4,694,354   9/1987  Tanaka et al. ........................ 358/76

Primary Examiner—Edward L. Coles, Sr.

[57] ABSTRACT

A method of proofing or previewing and image of an object on an exposed but undeveloped photographic film by substantially concurrently exposing and recording an electronic image of the same object, and visually displaying the electronically recorded image. Additional steps of the method may include recording instructions pertaining to the recorded image for use in initially determining whether to process the film, or for use in changing the parameters of the film processing or editing the photographic image.

20 Claims, 6 Drawing Figures

METHOD FOR PREVIEWING UNDEVELOPED FILM

RELATED APPLICATIONS AND PATENTS

This is a division of application Ser. No. 834,923, I filed Feb. 28, 1986; which, in turn, is a continuation-in-part of application Ser. No. 617,344, filed June 4, 1984, now U.S. Pat. No. 4,588,282.

BACKGROUND OF THE INVENTION

Field of Invention

This invention generally relates to methods and apparatus for optical imaging, processing and printing the images, and photocopying documents and objects. More specifically it is directed to electronic camera systems and multiple user camera systems and photocopier systems for imaging, photocopying, and image processing of individual or composite images.

In earlier ones of the above family of patents and applications there is disclosed multiple user photocopier systems including a series of separate, detachable, optical readers or scanners that are time shared or multiplexed to a lesser number of intelligent printers for making printed copies of the scanned or read images. In other ones of the earlier patents and applications, the copies systems comprise a series of stationary scanners that are multiplexed to a lesser number of printers in various modular systems of interconnectable components.

In more recent ones of the above applications and patents, there is additionally provided visual previewing of the images taken by the scanners or portable electronic cameras before making copies or prints thereof, and there is also provided electronic subsystems for improving the quality of the images before printing, by enhancing the degree of contrast or intensity of the images.

SUMMARY OF THE PRESENT INVENTION

According to the present invention, there is provided a number of additional features in such multiple user camera and copiers systems and methods. Initially, the portable electronic cameras employ both an electronic sensor and a conventional photographic film in a dual exposure system, to provide both an electronically recorded image and a conventional photographic latent image on film of the object or document to be recorded. The electronic sensor and associated electronic components provide the advantage of instant playback, visual previewing, and image processing of the captured image whereas the conventional photo film provides a latent image of much greater definition and detail than the recorded electronic image, where a higher definition print or recording is desired. The immediately available previewing of the electronically recorded image permits the user to carefully select for printing from the photo film only the desired ones of the photo frames from the film instead of having all frames printed in the conventional manner.

Additionally, according to the present invention, the portable electronic cameras or scanners may be provided in the form of portable modular subsystems that not only electronically image and record the objects or documents to be captured but also provide a electronic image processing subsystem to individually process the electronic images by cropping, enlarging, displacing or otherwise modifying the image, or that combine and process plural ones of the images to provide composite images. Among others, this modular camera subsystem may include as separate components a portable camera, portable memory, portable previewer, portable light source, portable electronic image processing system, and others.

According to still further features of the invention, there is provided a method ad apparatus for electronically reading out and printing images from a conventional photographic film without the need for chemically developing and printing the film in conventional fashion.

DETAILED DESCRIPTION OF PREFERRED EMBODIMENTS

Modular System

Figure 1:
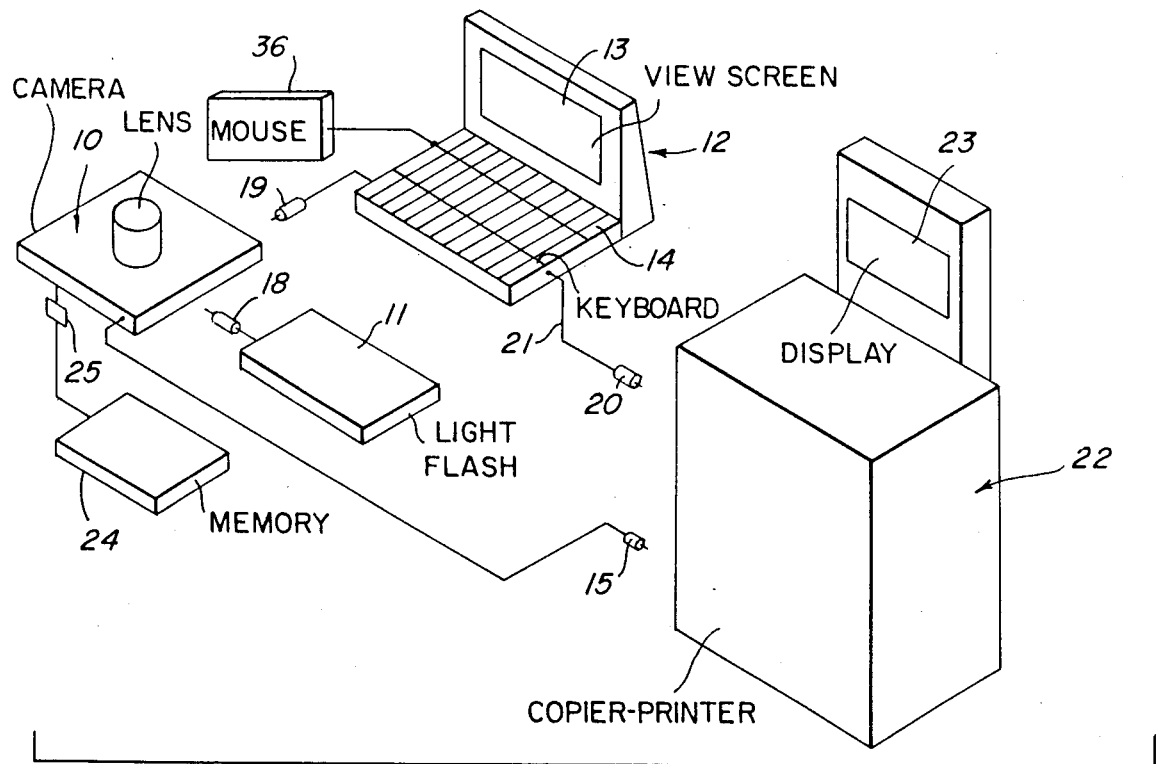
FIG. 1 is an exploded view showing a modular system of interconnectable components according to the invention.

Referring to FIG. 1, a modular system is shown including a portable electronic camera 10, portable light source 11, portable additional memory 24, and a portable image previewer and image processor 12, all in the form of modular components that may be carried about in a briefcase, in separated form, and detachably interconnectable together. The portable image previewer and processor 12 includes a fold-down flat electronic screen 13 and a keyboard 14 together with internal image selection and processing circuitry (not shown), for permitting the selection of images from memory 24, and/or the internal memory of the camera 10, and processing the selected image or images as will be described hereafter. All of these components are provided in small compact form that may be easily carried about in a portable bag (not shown) and interconnected together using the plug-in cables, plugs, and connectors 15, 16, 17, 18, 19, 20, 21, and 25, as shown. The portable camera 10 and images processor component 12 may also be detachably connected to a copier-printer unit 22, at a later time and location, using internal interface circuitry (not shown) and connectors 15 and 20, as illusrated.

The electronic still camera 10 may be one of a number as disclosed in the earlier patents above, that are multiplexed to the copier-printer 22 to make prints or copies of the recorded electronic images. Each camera 10 includes an electro-optical sensor, such as a CCD sensor, for receiving the optical images and generating corresponding electrical images; together with an internal memory for recording the electrical images. The external memory may be used to supplement the internal memory as will be appreciated by those skilled in the art. This electronic camera also necessarily includes read-in and read-out circuitry, and interfacing circuitry (all not shown) for electrical interfacing to the other components.

The portable lighting unit 11 is preferable an automatic electronic flash unit as commonly used for photgraphic purposes, providing high intensity light pulses when triggered by operation of the camera 10, with automatic termination of the light pulse upon reflection of sufficient light from the object of document being photographed.

The portable image processor and previewer 12 is preferably similar in configuration to presently available portable "lap top" type of computers or data processors on sale by Radio Shack and other companies. These employ a relatively large fold up-down screen for display 13, a keyboard 14 for inputting data and control functions, internal data processing circuitry and memory capacity, for storing and processing data and instructions. In addition, a number of such units internall include interfacing circuitry and modems. For purposes of the present invention, these units will be modified processors for image processing, including sufficient internal (and/or external ) memory capacity to receive electronic images, as selected, from its internal memory, or from memory 24, as selected from the keyboard 14 and display such selected images on the electronic screen 13 for previewing. As will be described hereafter the controls of the keyboard, supplemented by a mouse, or other available controls permit the user to process and edit the image, as desired, by cropping, enlarging portions, reducing selected portions, or displacing selected portions. Additionally, as disclosed in said earlier application above, the quanity of the image can also be improved by changing its degree of contrast and intensity. All of these graphic processing functions are performed by reading out selected ones of the still images that are electronically recorded in the internal memory of camera 10, and/or supplemental memory 24 and entering the selected images into the memory of the processor-previewer 12 for both display and processing. These recorded images in memory are erased in portions, enlarged, displaced, and otherwise processed in the memory of the processor 12, and each such change in the image is concurrently displayed to the user on the previewing screen. After processing, the processed image may be retained in nonvisible form in internal memory and/or can be later read-out to a copier-printer 22 over cable 21 and plug-in connector, that is detachably connectable to the copier-printer 22. As disclosed in earlier patents above, the transferred image may also be optically previewed on the display screen 23 of the copier-printer 22 before a hard copy is printed, and, if desired at that later time, the image can be further processed or improved at the copier-printer 22 to provide a more legible or otherwised enhanced print.

Hybrid Camera and System

Figure 2:
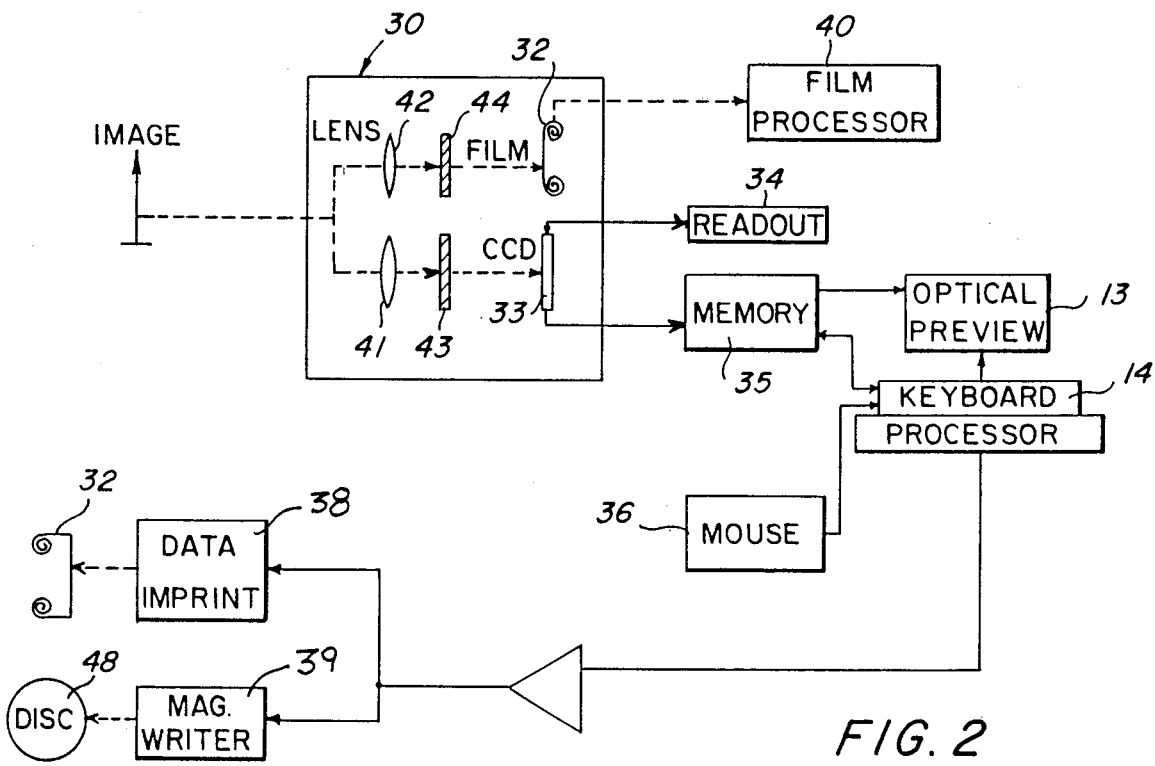
FIG. 2 is a block diagram, partially schematic, showing a hybid camera system for recording images both electronically and using conventional photographic film.

FIG. 2 illustrates one preferred electronic still camera 30 for concurrently applying an image 31 to be recorded to both a conventional photographic film 32 and to an electronic sensor 33, such as a CCD, vidicon tube or the like. The photographic film 32 receives and retains a latent image of the object or document 31 to be copied, and this latent image may be later chemically processed and printed at 40 in conventional fashion.

The electronic image at CCD 33 is concurrently received and readout into memory 35 by internal readout circuitry 34, and is retained in memory 35. Any one of the retained still images in memory 35 may be selected by the user of optical previewing at 13 and image processing, as described above, using the keyboard 14 and mouse 36 of the previewer-processor unit 12, as described above. As also illustrated the dual hybrid camera 30 is provided with a dual lens system 41 and 42, respectively, as well as a dual shutter system, 43 and 44, respectively, to control the time of exposure of the optical image to the two different mediums 32 and 33.

The advantages in providing a dual hybrid camera 30 as disclosed are manyfold. Initially, electronic camera sensors are not available to provide an image with the quality that is presently comparable to that of conventional silver halide type of photographic film. For example, at present high quality photo film can resolve an image into more than 18 million pixels whereas a comparable semiconductor CCD can provide only in the order of 360,000 pixels. Accordingly if there is need for a high definition print or enlargement of image 31, the film 32 provides a far superior medium, with much greater detail than is presently obtainable from the electronic sensor.

On the other hand, the electronic sensor 33 and memory 35 provides substantially instant playback and previewing of the image 31 without the delay of chemically developing and printing the film 32. Furthermore it is progressively becoming more costly to use and develop photo film whereas an electronically recorded image in memory 35 can be more promptly and less expensively printed on plain paper using available copier-printers 22 that may be laser types or CRT types. Furthermore the electrical image recorded in memory 35 can be more readily edited and optically processed, by manipulating the recording of the image. Thus for example, where the image 31 is recorded on a magnetic floppy disc memory, portions of the image can be erased, or selected portions readout to another memory to provide composite images, or enlarged in size, or otherwise manipulated in electronic or electromagnetic fashion.

To obtain the advantages of both systems, the electronic portions of the camera are employed to select the particular one or ones of the frames or images on the film 32 to be printed and to reject the others. This is performed by optically previewing on the screen 13 each of the images recorded in memory 35, permitting the user to substantially instantly pick and choose those to be photographically printed. Using the keyboard 14 of the processor 12 the selected frames to be printed are identified and recorded on a magnetic disc 48 or other memory, using a magnetic recorder 39, controlled by the processor 12, and the recorded magnetic disc 48 is sent with the exposed photo film 32 to the chemical film processor (not shown) where the film to be chemically developed and printed. Using this recorded information on the disc 48, only the selected frames are printed, thereby reducing the cost of printing all frames as is conventional. Additionally, during previewing of the electronic image, the user can also enter other instructions on the magnetic disc 48 or memory for the film processor. The user can instruct that certain portions of given frames be cropped, deleted, enlarged, displaced, or otherwise edited or changed. It will be appreciated that all of these instructions are made and recorded before the photo film 32 is developed, by optically previewing the electronic image recorded in memory 35 of the dual or hybrid camera 30. In the event that a higher quality image is not required from the photo film, the film 32 need not be developed and selectively printed but may be instead discarded.

As an alternative to the use of a separate magnetic disc 48, or other memory, for instructing the film processor, the print selection and editing information may be optically imprinted on the margin of the same photofilm 32 using an optical imprinter 38 controlled by the processor 12. The imprinter 38 latently exposes the margin of each frame on the photo film 32 with the user's instructions, including whether that frame is to be printed, and, if so, whether it is to be enlarged, reduced, cropped, or otherwise edited. Since automatically operating film developing and printing apparatus is presently available, the instructions on the film may be read automatically as each frame is advanced through the automatic printer (not shown) to control the printer for each frame.

The instant optical previewing of the recorded electronic image also permits the user to determine whether the image has been overexposed or underexposed. Where an overexposure has occured, the user instructs the imprinter 38 through keyboard 14 to mark that frame and instruct the automatic film printer to correct for the overexposure during printing. Similarly the film frame, or magnetic record 48, is imprinted to correct for underexposure during printing where the film negative of that frame has been underexposed. Thus the capability of the dual electronic camera to instantly preview the images, before development of the film 32, enables the user to select the film negative frames to be printed, as well as controlling the conditions of developing and printing the film 32 to correct for errors in exposure of each film frame. Where the user desires that other changes in processing and printing each selected frame be made, such as cropping, enlarging, reducing, physically displacing portions of the image, or others, the user merely enters the appropriate instructions on the keyboard 14 of the previewer 12, while viewing the electronic image, and these instructions are imprinted directly on the margin of the frame of the film being previewed, in digital form of otherwise, to automatically instruct in the processing of the photofilm. Alternatively, these instructions may be recorded for each frame on a separate record, such as magnetic disc 48; and disc 48 is sent to the film processing plant or machine along with the film to be developed and printed to control the developing and printing processes.

Portable Graphic Image Processing

Figure 3:
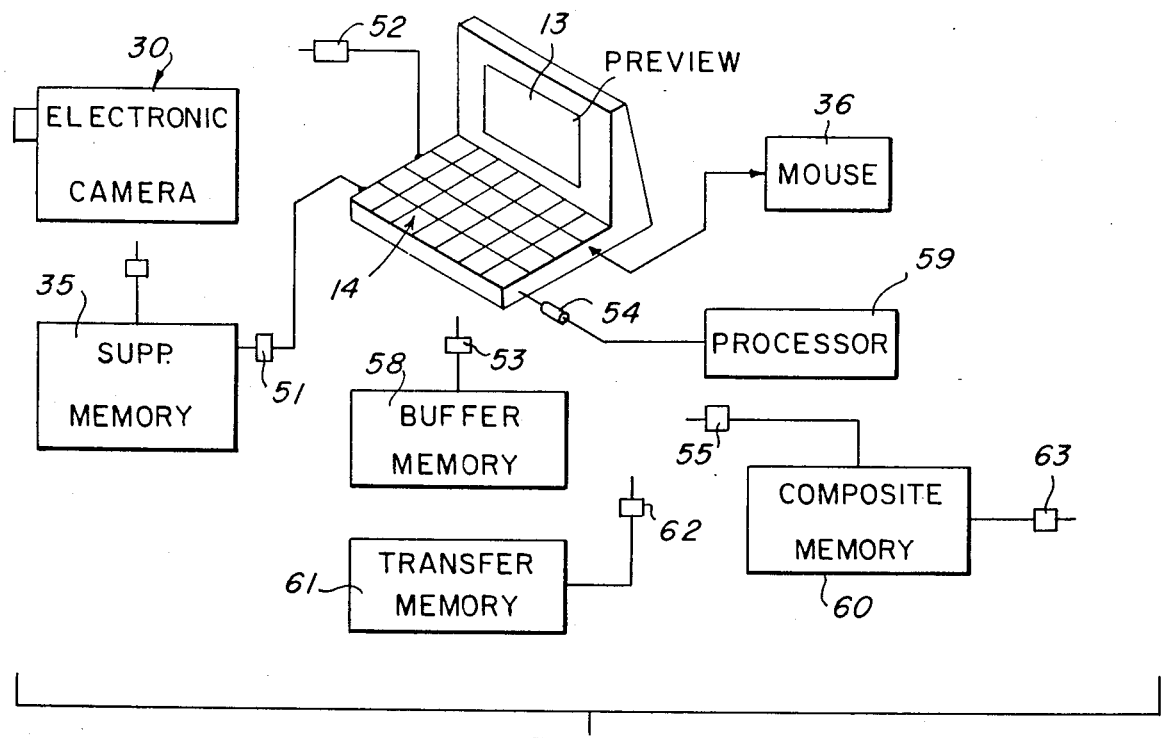
FIG. 3 is a partial schematic and partial block diagram, showing a portable image processing subsystem according to the invention.

In FIG. 3, there shown in greater detail the components and system for portable image taking and processing. Such a system differs from available image processing systems by enabling the images to be taken and processed directly at the sometime remote locations of the object or document where the use of conventional image processing equipment would not be feasible or convenient. These processed images are stored in portable memory and may be later viewed and/or printed in off line fashion when a printer-copier 22 (FIG. 1) becomes conveniently available.

Referring to FIG. 3, the system includes a portable electronic camera 30, as described above, together with interal memory (not shown) and supplemental memory 35 for receiving and storing electronic images taken by the camera 30. Each image frame taken by the camera 30, is successively stored in internal memory together with supplemental memory 35 and is coded in storage so as to be readily selected and retrieved for read-out to the portable processor-optical previewer 12. The processor-previewer 12 also has internal memory as well as supplemental buffer memory 58, as well as a composite image memory 60, whose functions will be described. The processor-previewer 12 may be provided with additional processor circuit boards, as needed, as well as with external controls for inputting commands, such as a mouse or wand 36, or the like. As discussed above, all of these components are available in small, portable, compact, modular form: and are detachably interconnectable to one another by cabling and plug-inn connectors 51,52,53,54,55,62, and 63, thereby to provide a portable electronic image taking and image processing system.

In operation, images taken by the camera 30 are converted to electronic signals by the internal sensor 33 (FIG. 2) and are successively recorded in internal memory and/or supplemental memory 35; and are individually coded for later retrieval. Using the keyboard 14, any one of these images can be retrieved from memory and read-out into the internal memory of processor-previewer 12, supplemented by additional plug-in memory 58. Each of these retrieved images are optically previewed on flat electronic screen (LCD, Plasma, or other), and can be individually processed to crop, delete, enlarge, reduce, or displace portions thereof, all in response to the user's commands by means of the keyboard 14 and/or the mouse, wand 36 or other external control. The processing circuitry in 12 operates upon the memory to modify the image in the manner commanded by the user, such as erasing portions of the image, selecting portions and rerecording in enlarged or reduced form, and others as known in the art. Such image processing is known and further description of these individual operations is not considered necessary to an understanding of the present invention.

During these image processing operations, the changes in the recording of the image are continuously presented on the screen 13 whereby the user can observe the manipulations of the image that are being made as they are made. After completion of the processing of each selected image, the processed image, or portion thereof, is read-out to a transfer memory 68 where it is again coded and retained for later retrieval. The internal memory and/or buffer memory 58 is concurrently cleared in readiness to receive and permit processing of the next image selected by the user for processing. Each processed image or portion retained in the transfer memory 61 can be later selected by its identity code for optical viewing and/or printing of a hard copy using printer-copier 22 (FIG. 1) or other output device.

Where it is desired to combine plural ones of the recorded images, or portions, each of the images to be combined is individually selected from the portable camera memory and entered into the memory 58 of the processor-previewer 12. Each such selected image is then processed as desired and then entered into the composite memory 60 instead of the transfer memory, as described above. The composite memory 60 is coupled to the optical previewer 12 to optically display the cumulatively combined images as they are entered into the composite memory 60, and the user can displace or further modify, each of the images as it is entered using the keyboard 14, mouse, wand 36, or other controls. The user can therefore combine a series of images, or processed images in a single display, known in the art as a "cut and paste" composite image. Each such resulting composite image is also coded and retained in composite memory 60 and can be selected and retrieved for read-out to a copier-printer 22 (FIG. 1) for display at screen 23 or for printing a hard copy.

As noted above, all of the components of FIG. 3 are small, compact, and readily portable, and are detachably interconnectable using the cabling and connectors, as shown, to provide a modular system. Additional memory units and/or processor boards can be added or deleted, to provide systems of adjustable capability depending upon the needs of an individual user. Each of the images recorded from the portable still electronic camera 30 can also be selectively recalled from memory without change and be optically previewed and/or printed; as can each one of the processed images, or composite processed series of images. Therefore the user is provided with a versatile portable image processing system, of adjustable capacity, that may be carried about and taken to often remote locations for imaging, that are often not accessable to conventional console or desk top type image processors. This portable system provides the added advantage of permitting the user to rerecord images that are not adequate without leaving the often distant site where the object or document 31 (FIG. 2) may be located; and to process such images at that site so that changes can be made while at the site. In conventional systems, the object or document to be copied must be brought to the fixed location of an available photocopier or printer, and the image processing must also be preformed at that fixed location or site regardless of whether or not that location is convenient to the user and/or convenient to the location of the object or document to be copied.

Automatic Film Frame Selection and Processing

Figure 4:
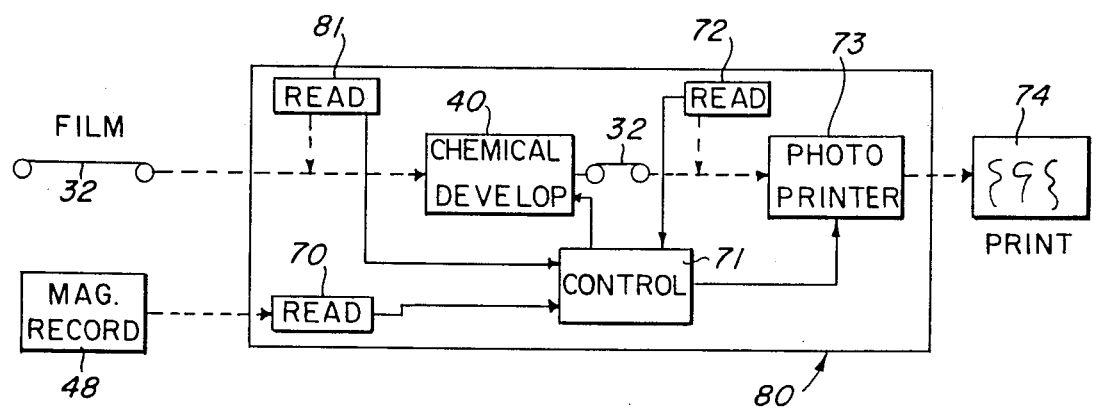
FIG. 4 is a partial schematic and partial electronic block diagram, showing the printing of selected frames of a photographic film.

FIG. 4 illustrates an automatic system for controlling the chemical development and the printing of selected frames from the photographic film 32 in the dual camera 30 (FIG. 2) according to recorded instructions from the user before the film is developed. As noted above, the user has the advantage in this dual camera 30 of substantially instant playback of the recorded electronic images before the film 32 is developed. Therefore making use of such instant playback, and optically previewing each of the recorded images on the electronic screen 13, the user can determine before developing the film 32 which of the film frames is desired to be printed, as well as the changes to be made in developing and printing to correct for errors and improve the prints by cropping, enlarging, reducing, and the like. As shown in FIG. 4 the magnetic disc 48, or other record, containing the instructions is inserted into the machine 80 along with the exposed photo film 32. The recorded instructions on record 48 are read by the reader 70 and applied to digitally operated controls 71 within the machine to control the parameters of the chemical developing process of the film at tanks 40. Among others, an underexposed or overexposed film 32 can be overdeveloped or underdeveloped, respectively, to compensate for these errors in exposure (that are shown by previewing the electronic image from the CCD sensor). After development, the photo film negative 32 is directed past a reader and into the photoprinting mechanism 73 that is also under control of control unit 71 to control the parameters of printing in response to the recorded instructions on the magnetic record 48. The control unit 71 selects the particular ones of the frames on the developed film as the individual frames are detected passing the reader 72. Only those frames identified on the magnetic record 48 are printed by the unit 73, and the prints 74 are dispensed at the outlet of the automatic machine 80. As stated above, the instructions recorded on record 48 may also instuct the machine to crop, enlarge, reduce, displace, or otherwise modify the printing of anyone of the film frame negatives. These additional instructions are also detected or read by reader 70 from the magnetic record and applied as input signals to the automatic controls 71 to control the photo printer mechanism 73 to make these changes and editing of the prints.

As stated above, these instuctions may alternatively may be imprinted directly on the margins of the film negative 32 alongside each of the frames, instead of using a separate record 48. In this alternative arrangement a reader 81 is located within the machine 80 before the chemical developing bath to read the developing instructions imprinted on the undeveloped film 32. These These instructions from reader 81 are applied as input command signals to the control subsystem 71, in the same manner discussed above, to control the development of the film, with compensation as required for over and underexpose of the film or other changes made. After development of the film 32, the film is advanced past the reader 72 where the recorded instructions pertaining to the printing of selected frames, as well as editing and otherwise changing the prints are read and entered in the control subsystem 71 to effect the changes in the selected prints, all as discussed above.

Electronic Readout of Exposed Photographic Film

Figure 5:
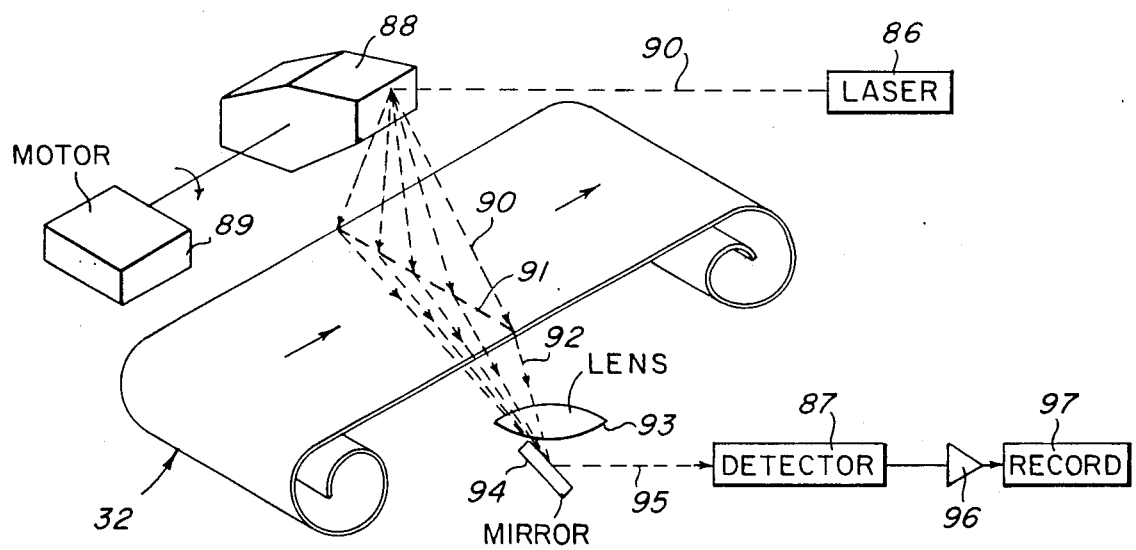
FIG. 5 is a prespective view, partially schematic, showing nonchemical readout of the latent images in a photographic film.

FIG. 5 illustrates an electro-optical method and apparatus for destructively reading out the latent images in an exposed but undeveloped photo film, without the need for chemically processing the film. As shown, a low intensity, fine laser beam 90, having light frequencies with the visible sensitive band of the film 32, is rapidly scanned in a series of lines forming a rectangular roster across the film 32 as the film 32 is advanced longitudinally. The intensity of the beam 90 taken with the speed of scanning the lines is adjusted to apply only sufficient light energy to each incremental area of the film 32 to expose the light sensitive halide crystals into a condition of saturation. However, the time-intensity integral of exposure is carefully controlled to be sufficiently low so as not to greatly exceed this saturation level. A lens system 93 and mirror 94 is properly located to receive the scanning beam after its passage through the film 32, and collect and apply the received light to an electronic light sensor or detector 87, where the received light is converted into an electrical signal and amplified at 96. After a sufficient level of amplification the minute received signal is recorded at 97 to provide an electrical image corresponding to each latent image on the exposed but undeveloped photo film.

As each incremental portion of the film 32 is rapidly scanned by the light beam 90, a different quanta of energy is absorbed by the light sensitive crystals in the fim at that position, adding to the previous (by the latent image) and driving the crystals at that position into a saturated condition. Where the previous exposure at that position has been at a lower level, a greater quanta of light energy is absorbed from the beam 90; whereas where the latent image at that position has been previously exposed to greater light energy, a lesser quantity of light energy from the beam 90 is absorbed. Therefore the signal received by detector 87 will minutely vary according to the latent image as the low level laser beam 90 rapidly scans each frame of the film. It will be appreciated that the laser scanning speed will be very high to provide an extremely short exposure of the film 32, and that a highly sensitive detector system 87 and very high gain amplifiers 96 are required to reproduce the very low level variation in the scanning beam resulting from light absorption by the light sensitive crystals in the film 32.

The high speed scanning mechanism for very rapidly sweeping the laser beam 90 in a series of displaced lines 91 across the film 32 may comprise a multifaceted prism 88 driven by high speed motor 89, as is now commonly used in high speed laser printers. After passing through the film 32, the reduced intensity laser beam 92 is collected by a lens system 93, or parabolic mirror (not shown), or other optical collector and focused onto a suitably arranged mirror 94 to be directed to the light sensitive electronic detector 87, as described above.

Figure 6:
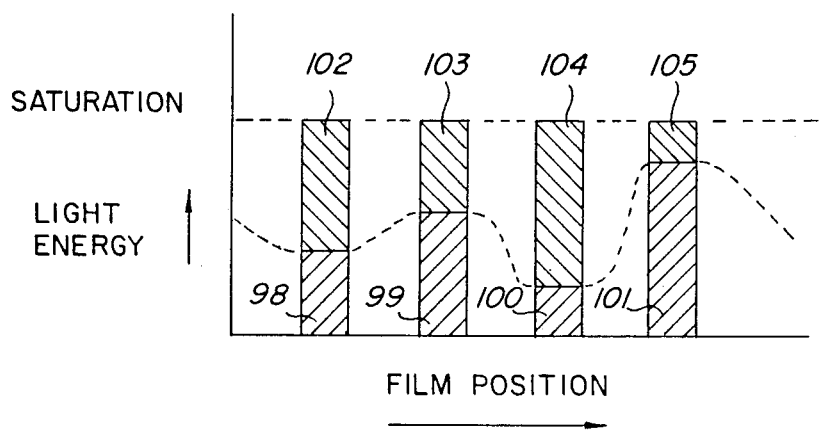
FIG. 6 is a simplied illustration of the varying degree of light absorption by the film crystals.

FIG. 6 is a simplified illustration of the varying degree of light absorption by the film crystals at each different incremental area of the film 32 as the beam 90 sweeps past that incremental area. At the area to the left in FIG. 6, the quanta of light energy previously absorbed in forming the latent image is represented by the region designated 98. The area above region 98, and indicated as 102 represents the additional quanta of energy absorbed by the film 32 at that incremental area that is necessary to drive the crystal in that area into a saturated condition. At the next position on the chart representing an adjoining incrementally small area on the film 32, the initial energy absorbed and forming the latent image is shown at region 99. This differs from area 98 since the latent image in the film differs from position to position along the film. Consequently, a lesser quanta of light energy 103 from the laser beam 90 is absorbed at that position to drive the crystals into saturated condition, as shown at 103. In a similar manner, each of the next two incrementally small areas on the film 32 have previously received different quantities of light energy to form the latent image in the film, as represented by the regions 100 and 101 in FIG. 6. Therfore the energy absorbed by the crystals are those two minute positions from the scanning laser beam 90 differ as shown at areas 104 and 105, repectively. Thus the amount of light received by detector 87 as the film 32 is scanned by the low level laser beam 90 varies in inverse proportion to the latent image stored in the film 32, and this system provides an electrical signal readout of the previous light exposure of the film 32.

It will be appreicated that this electro-optical readout of the latent image in film 32 is destructive, in that the film is driven into a fully saturated condition by the scanning laser beam 90 to erase the latent image. The reading out of the image in this manner, must, of course, be performed in a dark environment to prevent spurious exposure of the light sensitive film 32, or in an illuminated environment outside of the light sensitive frequency of the film 32. For films of different light sensitiveness (higher or lower ASA ratings), the scanning speed of the laser beam is varied as well as the longitudinal speed of the film 32 to correspondingly change the time of exposure of the film 32 to the laser beam 90.

What is claimed is:

1. A method of previewing exposed but undeveloped still image frames in a photographic film prior to development of the film, comprising the steps of:

obtaining and recording a series of corresponding electronic images substantially concurrently with the exposure of each of a corresponding series of frames of the photographic film, optically previewing each of the recorded electronic images prior to developing the photographic film, to select those frames of interest, and recording instructions pertaining to the selected frames.

2. In the method of claim 1, the step of additionally recording instructionspertaining to variations in the processing of the selected frames of the photographic film, thereby to modify the resulting photographic prints obtained from the film.

3. In the method of claim 1, the recording of instructions being made on the photographic film.

4. In the method of claim 1, the step of recording additional instructions pertaining to variations in the processing of selected frames of the film, and the additional step of reading out the recording of instructions during the processing of the film to control the parameters of the processing.

5. In the method of claim 1, the recording of instructions being made on a member other than the film.

6. In the method of claim 1, the recording of instructions pertaining to editing of selected frames in the photographic film.

7. A method of previewing exposed but undeveloped still images in a photographic film prior to development of the film, comprising the steps of:

obtaining and recording an electronic image substantially concurrently with the exposure of the still image in the film, and corresponding to the film image, and optically previewing the recorded electronic image prior to developing the film.

8. In the method of claim 7, the additional step of recording instructions pertaining to the image when previewing the recorded electronic image.

9. In the method of claim 7, the additional step of recording instructions about the previewed electronic image pertaining to the processing and printing of the photographic film.

10. In the method of claim 7, the additional step of recording instructions about the previewed electronic image on the photographic film.

11. In the method of claim 7, the additional step of recording instructions about the previewed electronic image on a member other than the photographic film.

12. In the method of claim 7, the additional steps of recording instructions about the previewed image, and reading out the recorded instructions during processing and printing of the photographic film to control the parameters of the processing and printing.

13. In the method of claim 7, the additional step of recording instructions concerning editing of the undeveloped still image in the photo film on one of the photographic film itself and a member other than the photographic film.

14. In the method of claim 13, the additional step of reading out the recorded instructions during processing and printing of the film to edit the still image during processing and printing according to the recorded instructions.

15. A method of previewing an exposed but undeveloped photographic film containing a latent still image, comprising the steps of:

separately obtaining and recording a corresponding still electronic image substantially concurrently with the exposure of the photographic film to the image, reading out the recorded electronic still image to visually display an image corresponding to the latent image in the photographic film, and recording instructions during previewing of the electronic image pertaining to one of selecting a image for processing and printing, changing the parameters of processing and printing of the film, and editing of the still image during processing and printing of the photographic film.

16. In the method of claim 15, the recording of instructions being made on the photographic film.

17. In the method of claim 15, the recording of instructions being made on a member other than the photographic film.

18. In the method of claim 15, the additional step of reading out the instructions during the processing and printing of the photographic film to control the parameters of the processing and printing.

19. In the method of claim 15, a series of still images being serially exposed but undeveloped in the photographic film, a series of still electronic images being obtained and recorded, each substantially concurrently with a corresponding one of the film images, and each recording substantially the same subject matter as the corresponding film image, and the previewing of the electronic images assisting in the selection of the film images to be processed and printed, and edited.

20. In the method of claim 19, the additional step of reading out the recorded instructions during processing and printing of the photographic film, to control the parameters of the processing, printing, and editing of the images.

* * * * *